United States Patent
Kunz et al.

(10) Patent No.: US 9,812,960 B2
(45) Date of Patent: Nov. 7, 2017

(54) METHODS AND APPARATUS FOR A LOW STANDBY CURRENT DC-DC POWER CONTROLLER WITH IMPROVED TRANSIENT RESPONSE

(71) Applicant: Texas Instruments Incorporated, Dallas, TX (US)

(72) Inventors: Keith Edmund Kunz, Bryan, TX (US); Vipul Kumar Singhal, Bangalore (IN); Rajat Chauhan, Bangalore (IN); Per Torstein Røine, Oslo (NO); Danielle Griffith, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 3 days.

(21) Appl. No.: 14/983,227

(22) Filed: Dec. 29, 2015

(65) Prior Publication Data

US 2017/0187286 A1 Jun. 29, 2017

(51) Int. Cl.
*G05F 1/613* (2006.01)
*H02M 3/158* (2006.01)
*H02M 1/00* (2006.01)

(52) U.S. Cl.
CPC .... *H02M 3/158* (2013.01); *H02M 2001/0032* (2013.01)

(58) Field of Classification Search
CPC .............. H02M 3/1588; H02M 3/158; H02M 2001/0032; H03F 1/0244; H03F 3/3223
USPC ............ 323/222, 224, 282–290; 307/66, 87; 330/127, 149, 297
See application file for complete search history.

(56) References Cited

U.S. PATENT DOCUMENTS

| | | | | |
|---|---|---|---|---|
| 5,387,809 A | * | 2/1995 | Yamagishi | H01L 27/11898 257/203 |
| 6,407,641 B1 | * | 6/2002 | Williams | H03L 7/085 327/159 |
| 6,809,678 B2 | * | 10/2004 | Vera | H02J 1/102 323/299 |
| 6,969,978 B2 | * | 11/2005 | Dening | H02M 3/156 323/282 |

(Continued)

OTHER PUBLICATIONS

Swathi, R. and M. B. Srinivas, "All Digital Duty Cycle Correction Circuit in 90nm based on mutex." 2009 IEEE Computer Society Annual Symposium on VLSI, pp. 258-262.

*Primary Examiner* — Rajnikant Patel
(74) *Attorney, Agent, or Firm* — John R. Pessetto; Charles A. Brill; Frank D. Cimino

(57) ABSTRACT

Methods and apparatus for DC-DC power controller with low standby current and fast transient response. In an example arrangement, an apparatus includes a voltage converter outputting a direct current output voltage, configured to increase the output voltage responsive to an enable control signal; at least one feedback comparator configured to output a first control signal, the feedback comparator being active responsive to an edge at a clock signal input; an adjustable frequency oscillator for outputting a first clock signal; and a fast transient detect circuit configured to output a second signal asynchronously upon detecting a rapid change greater than a voltage threshold in the output voltage; the voltage converter receiving the enable control signal when either the first clock signal is active, or the second signal is active and the output voltage is less than a reference voltage. Additional apparatus and methods are disclosed.

20 Claims, 9 Drawing Sheets

(56) References Cited

U.S. PATENT DOCUMENTS

| | | | |
|---|---|---|---|
| 7,395,447 B2 * | 7/2008 | Prihadi | G06F 1/08 713/400 |
| 7,576,527 B1 | 8/2009 | Zhang et al. | |
| 7,706,152 B2 | 4/2010 | Shen et al. | |
| 7,782,141 B2 * | 8/2010 | Witmer | H03F 1/0244 330/127 |
| 7,902,800 B2 * | 3/2011 | Jain | H02M 3/1588 323/224 |
| 8,125,201 B2 | 2/2012 | Descombes | |
| 2013/0314067 A1 | 11/2013 | Matzberger et al. | |

\* cited by examiner

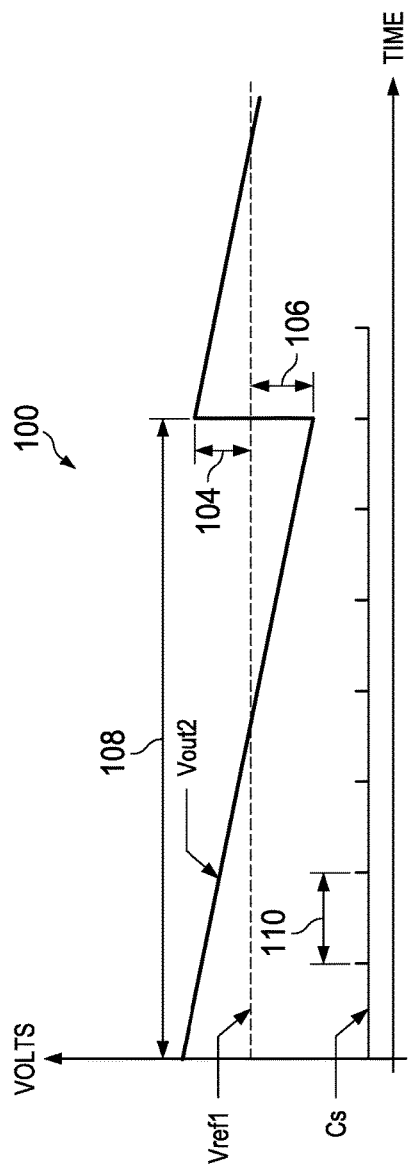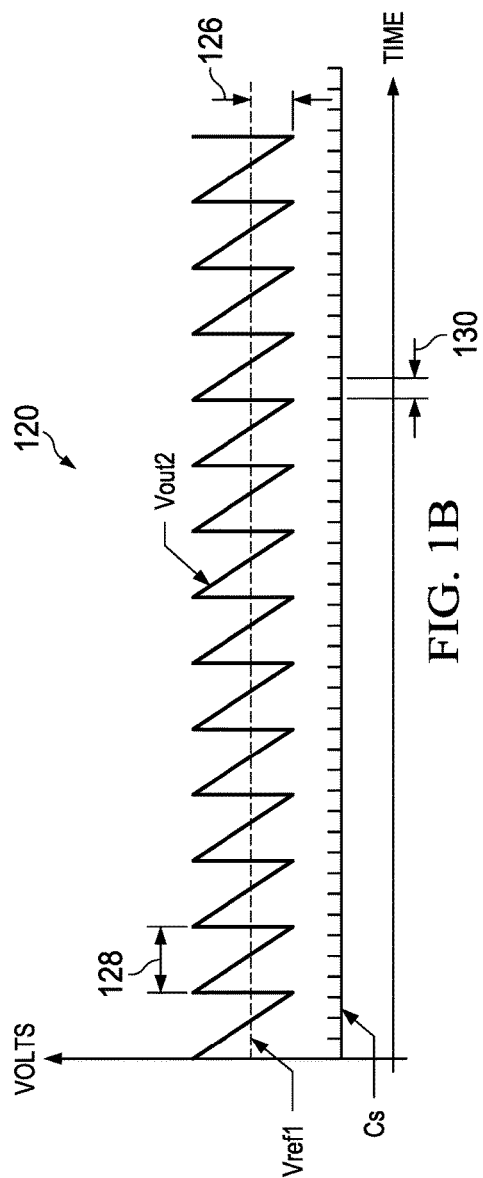
FIG. 1A
FIG. 1B

| # | PARAMETER | ULP A | ULP B | BEST IN CLASS | % DELTA |
|---|---|---|---|---|---|
| 1 | OUTPUT CAP (nF) | 500 | 10,000 | 100,000 | 90 TO 99.5 % REDUCTION |
| 2 | $I_{LOAD}$ STEP (mA) | 0-5 | 0-100 | 5-50 | DOUBLE LOAD STEP |
| 3 | Vrec (mV/sec) | 10.0 | 10.0 | 0.5 | 20X FASTER |
| 4 | Iq (nA) | 28 | 39 | 720 | 94.6 TO 96.1 % REDUCTION |
| 5 | Vdip (mV) | 12.3 | 9 | 37 | 66.8 TO 75.7 % REDUCTION |
| 6 | TRANSIENT FOM | 7ps | 0.5 ps | 1.2 ns | 2400X |

METHODS AND APPARATUS FOR A LOW STANDBY CURRENT DC-DC POWER CONTROLLER WITH IMPROVED TRANSIENT RESPONSE

TECHNICAL FIELD

The present application relates in general to electronic circuitry, and in particular to a very low standby power method and circuitry for controlling DC-DC converters.

BACKGROUND

DC-DC converters are common circuits used in modern electronics for the purpose of supplying a DC voltage at one level from another. These are particularly useful building blocks for the ever growing popularity of battery powered or cordless devices. Typical integrated circuit components require a power supply of 3.3 volts or more. A typical alkaline battery cell will have a starting voltage of near 1.5 v and will have an end of life voltage about 1.1V. The DC-DC converter provides two important functions. The first is to step up the battery voltage from the 1.5V battery power range to the 3.3V range, and the second is to compensate for the normal 25% drop of the battery voltage and still supply a stable 3.3V to the device electronics. These basic functions are somewhat taken for granted in the DC-DC converter marketplace, and focus has shifted to ever increasing demand for prolonging battery life though the pursuit of a highly-efficient, ultra-low power DC-DC converters. DC-DC converters are commonly described as "buck" if the output level is lower than the input voltage, "boost" if the output level is higher than the input voltage, and "buck-boost" if the converter can provide an output voltage from a variety of input voltage levels. The DC-DC converters require control circuitry and methods to maintain the output voltage at a determined level, and in low power converters, all can benefit from a "sleep" or standby mode where the power consumed is reduced during periods of no demand from a load coupled at the output.

In pursuit of highly efficient, ultra-low power DC-DC converters, two characteristics are particularly relevant. The first and primary differentiator is low power consumption and in particular, low standby current or quiescent current (Iq). In low power converter operation, Iq is the limiting factor in improving the converter efficiency. Iq is the current used by the DC-DC converter when the converter is on, but there is little or no load current demanded by the device. This condition is typically present during an operational state termed "sleep mode". The lower the power consumption in sleep mode, the longer batteries in the device will generally last between charges, since sleep mode is the predominant mode for many battery powered devices.

The second characteristic is transient output voltage regulation. The quality of the output voltage regulation during load transients is specified by two parameters: Vdip and Vrec. Vdip is the variation between the desired output voltage and the actual output voltage (Vout) when a fast transient load occurs during the sleep mode. Vout recovery slew rate (Vrec) indicates how quickly a DC-DC converter is able to recover from a Vdip event. These two parameters, Vdip and Vrec, help determine the quality of the transient load regulation. Improving the converter performance for these transient parameters is usually at odds with the additional goal of maintaining a low Iq for a DC-DC converter. The opposing relationship between these design parameters will be described in the following example.

A battery powered cordless mouse is a common consumer device that will serve as an illustrative, non-limiting example application. Within the example mouse, a single battery or battery pack feeds a DC-DC power converter, which in turn supplies 3.3V power to the rest of the mouse movement and transmission electronics. When the mouse is switched on, yet is sitting idle on a desk for example, the mouse electronics goes into an inactive mode where the mouse electronics are using as little power as possible, while waiting to detect movement. During this time, the DC-DC converter maintains the mouse electronics voltage at the 3.3V level while it can also conserve power by operating in its "sleep mode". The inactive mode is the predominant mode of a battery powered mouse and the sleep mode is the predominant mode for the low power DC-DC converter, hence the focus on low standby current, Iq, in DC-DC converters.

FIGS. 1A and 1B show in a pair of graphs the voltage decay and error in a sampled or clocked DC-DC converter. In FIG. 1A, graph 100 illustrates voltage on the vertical axis and time on the horizontal axis. Graph 100 plots the desired output voltage (Vref1), the sample clock (Cs) and the actual output voltage (Vout2). Graph 100 illustrates the predominant mode, where in the example mouse the electronics would be considered to be in a steady state low power mode. In this mode the device load is very low, causing the decay of the output voltage Vout2 to decrease very gradually, as illustrated in the time period labeled 108. To save power in the sampled DC-DC converter, the sample clock Cs period is extended to a maximum time interval between pulses labeled 110. During the voltage decay, the sample clock Cs triggers a comparator to inspect the converter output voltage $V_{OUT2}$ at the intervals 110. At the end of period 108, the $V_{OUT2}$ error 106 reaches a lower threshold, which triggers the DC-DC converter to become active and increase the output voltage $V_{OUT2}$. After the DC-DC converter is enabled following the trigger event, the output voltage begins rising to a level 104 which is slightly above the desired Vref1 level. It is important to note that during the time periods 108 while the output voltage is gradually decaying, the DC-DC converter may be in its sleep mode and the sample interval 110 is much longer than the sample interval used during an active supply mode. In sleep mode the sample interval is increased so as to further conserve power. The current consumed by the DC-DC converter in periods when the device is using very little power (Iq) is the characteristic that helps extend the life of the batteries. A lower Iq is desired to further extend the battery life. By extending the time between samples, the standby power is further reduced.

In the example mouse, when the mouse is moved, the electronics are set into action and a much heavier current load is suddenly placed on the output voltage and the battery, as movement data is detected and transmitted during a mode that will be called "active mode". In FIG. 1B a sample graph 120 is presented with voltage on the vertical axis and time on the horizontal axis, and plots the desired output voltage (Vref1), the sample clock (Cs) and the actual output voltage (Vout2) during active mode. Graph 120 illustrates typical voltage trends and sample clock for a DC-D converter during active use. In graph 120, the voltage decay at the output is much steeper, as illustrated during period 128, when compared to the decay in time period 108 shown in graph 100. Because of this faster decay time, the sample clock period Cs is shortened (the clock frequency is increased) to a minimum time interval between clocks 130 so that voltage regulation is improved and the allowable voltage error 126 is not exceeded. Having reviewed the steady state cases, sleep mode and active mode, the transition from sleep mode to active mode will now be described to illustrate the importance of output voltage regulation during transients, and to show why the sample clock Cs cannot be arbitrarily set to a very long interval.

FIG. 2 presents in a sample graph 200 a transient output voltage and sample clock change in a low power DC-DC converter. In FIG. 2, sample graph 200 is shown with voltage on the vertical axis and time on the horizontal axis and plots the desired output voltage (Vref1), the sample clock (Cs) and the actual output voltage trends ($V_{OUT2}$). In graph 200, the time period 208 is a lightly loaded or sleep mode region, while time period 210 depicts a transition period where the sample clock interval becomes successively smaller in response to an increased load at the output, and time period 212 show a period where Cs has decreased to a minimum interval in an active mode region.

In sampled DC-DC converter designs, the parameters Vdip and Vrec are general indicators of the quality of voltage load regulation and are usually inversely proportional to the standby current Iq. The worst case Vdip generally occurs under the condition where the DC-DC converter is in sleep mode and a heavy load is applied at the output just after a Cs clock edge. In that event, illustrated in graph 200 at point 204, the output voltage Vout will begin a steep decline. When the next Cs sample occurs, illustrated at point 206, the voltage error is detected and the DC-DC converter is enabled to correct Vout. The difference between the desired voltage Vref1 and the lowest output voltage point 206 is defined as the characteristic Vdip. In a commercially available best-in-class low power DC-DC converter, the Vdip is specified as 37 mV. Furthermore, the recovery characteristic Vrec is the slew rate that the Vout achieves in recovering from Vdip. In graph 200, Vrec would be the delta voltage 220 divided by the time to recover 222 and in the same best-in-class low power DC-DC converter described previously, the Vrec is specified as 0.5 mV/microsecond (μSec). (In an ideal converter, the Vdip would be zero and the Vrec would be infinite, however in a practical design the ideal is not possible.)

Furthermore, the competing goals of low power during sleep mode and transient output regulation can be illustrated by this example shown in graph 200. If better output voltage regulation is desired, that could be accomplished by increasing the sleep mode Cs frequency (shorter Cs time intervals), however that in turn increases the sleep mode power consumption. Conversely, if a lower sleep mode power is desired, reducing the frequency of the sleep mode Cs clock would accomplish that goal, however it comes at the expense of the Vout falling to a lower level before correction begins (larger Vdip), thus making load regulation worse. In the DC-DC converters of the prior known solutions, these parameters present a design trade-off, as lower quiescent current Iq cannot be obtained while also improving Vdip and Vrec.

FIG. 3 is a circuit block diagram 300 of a low power, sampled DC-DC converter using a prior known approach. In 300, four sections, numbered 302, 304, 306 and 308, denote components that are active in common operational times. The first section 302 contains a digital control block 310 which receives three signals, an enable signal En1, a sample clock Cs and the output voltage Vout. The digital control block 310 is coupled to an oscillator 312. The oscillator receives as input the voltage $V_{OUT}$ and outputs the sample clock (Cs) which is fed back to the digital control 310 and into a clock comparator 322 in section 304. In section 304 a system reference 320 outputs a reference voltage Vref which is coupled to clock comparator 322. The clock comparator also receives voltage $V_{OUT}$ and the sample clock Cs from the oscillator 312.

An enable signal (En) is output by the clock comparator and is coupled to the digital control 310 in section 302 and to the DC-DC converter in section 306. In section 306 a DC-DC converter 330 receives an enable signal (En) from comparator 322 and an input voltage VIN to be converted to the output a voltage $V_{OUT}$. The $V_{OUT}$ is coupled to a load 340. Additionally, the output voltage $V_{OUT}$ is coupled back as a feedback signal for use in sections 302 and 304 as previously described. The load 340 includes an output capacitance, and an impedance.

In this example prior known approach low power DC-DC converter, section 302 is always actively drawing power, with the digital control section 310 counting the enable signals En and adjusting the frequency rate at which the oscillator 314 outputs sample clocks Cs. The oscillator frequency is increased with increasing numbers of En signals (indicating additional demand from the load) and decreased with fewer En signals (indicating reducing demand from the load) in a given time period. The result is a varying Cs frequency, such as is illustrated by the plots of a Cs signal in FIG. 1 and FIG. 2. Section 304 is only powered when a sample clock Cs is active. In section 304 a reference voltage is provided by a system ref block 320. Vref is compared to the $V_{OUT}$ at comparator 322 and if $V_{OUT}$ is less than Vref, an enable signal (En) is generated. At that point, these 2 components turn off until the next sample clock Cs arrives, thus conserving power. A stand-alone control section 305 consists of section 302 and 304 as illustrated and within that control section outputs an enable signal for a DC-DC converter receives the output voltage $V_{OUT}$.

Section 306 contains a DC-DC converter 330 that performs the DC-DC voltage conversion when the enable signal is active. The output signal $V_{OUT}$ could operate as illustrated by the plots of $V_{OUT2}$ in FIG. 1 and FIG. 2. Section 308 contains sample load 340.

FIG. 4 depicts in a block diagram 400 additional details of an example implementation for the control functions of the circuit 300 of FIG. 3. In FIG. 4, for convenience of explanation, the lower digits of the blocks 412, 410, 422 are the same as the lower digits for the corresponding blocks 312, 310, 322 in FIG. 3. In FIG. 4, the oscillator 412 is shown implemented, in a non-limiting example, as a current-capacitor or I/C oscillator, with weighted current sources charging a capacitor to form a clock pulse. A control input labeled CNTRL (n:0) provides a thermometer control code to enable the current sources. A sample clock is used to enable a clocked comparator 422 that compares a feedback of the output voltage, labeled Vfb, to a reference voltage level and outputs an enable signal En when the output voltage is below the reference level and the clock Cs is active.

A digital controller 410, which corresponds to the controller 310 in FIG. 3, can be used to control the frequency of the adjustable oscillator 412. In FIG. 4, a possible implementation is shown, however the arrangements of the present application can also use alternative arrangements to implement the controller. In FIG. 4, a counter 450 counts the clocks between enable signals output from the comparator 422. The controller 410 uses a pair of comparators 452, 454 that each compares the number of enable signals, or KICK signals, counted over a time period to a maximum and a minimum level. If the number of clocks counted between the KICK signals is too high, greater than the maximum as indicated by comparator 454, a count is decremented in block 458, and the oscillator frequency is reduced. If the number counted is below a minimum as indicated by comparator 452, the counter in block 458 is incremented, and the frequency is increased. In this manner the oscillator 412 is dynamically adjusted by controller 410 to keep the output voltage Vout within certain error ranges, while simultaneously reducing power when demand at the load is low.

A sampled DC-DC converter as illustrated by block diagram 300 can generate waveforms similar to those described in FIG. 1 and FIG. 2. The principal function of the control circuitry in section 305 is to make the entire DC-DC conversion process consume as little power as possible when it is in a sleep mode, while also providing acceptable load regulation in response to current demanded by the load on the Vout terminal. The low power consumption corresponds to having a small Iq, small Vdip and a fast Vrec. As explained above, when using prior known approach converters, improvements in transient response performance (improvements in Vdip and Vrec) conflicts with additional improvements in the Iq current.

Therefore, continuing improvements are needed in methods and apparatus for low power, low Iq, fast transient response in DC-DC converters. Aspects of the present application will improve upon the prior known approaches in providing low power sampled DC-DC converters and corresponding control circuitry and methods.

SUMMARY

In the arrangements of the present application, a low standby current DC-DC converter with fast transient response is provided. A fast transient detector is used in a fast control loop that is operated asynchronously to a slower control loop operating in a synchronous manner by clocking a comparator with an adjustable oscillator. Because only the fast transient detector and the adjustable oscillator are always active, while the majority of the circuit blocks are inactive for most of the time, standby power is reduced. The fast transient detect circuitry and control circuitry enables the DC-DC converter to rapidly respond to a change in load current, even while the adjustable oscillator is running in a sleep or standby mode. An extra enable signal can be generated by the fast transient detector to enable the converter to respond quickly to transients in the output voltage.

In an example arrangement, an apparatus includes a voltage converter receiving a direct current voltage input and outputting a direct current output voltage, configured to increase the output voltage responsive to an enable control signal; at least one feedback comparator configured to output a first control signal when the output voltage is less than a reference voltage, the feedback comparator being active responsive to an edge at a clock signal input; an adjustable frequency oscillator for outputting a first clock signal at a predetermined frequency responsive to a control signal, the at least one feedback comparator receiving a clock signal corresponding to the first clock signal; and a fast transient detect circuit configured to output a second signal asynchronously upon detecting a rapid change greater than a voltage threshold in the output voltage; the voltage converter receiving the enable control signal when either the first clock signal is active and the at least one feedback comparator outputs the first control signal, or the second signal is active and the output voltage is less than a reference voltage.

In a further arrangement, in the apparatus described above, the fast transient detect circuit further includes an input for receiving the output voltage, an output buffer for outputting a pulse on the second signal responsive to a rapid decrease in the output voltage, and clocked input transistors for receiving a bias current from a bias current source.

In still another arrangement, in the apparatus described above, the apparatus includes an arbiter circuit having an output coupled to the clock input signal of the at least one comparator, and having a first input coupled to the first clock signal and a second input coupled to the second clock signal.

In yet another arrangement, in the above described apparatus, the at least one comparator outputs the converter enable signal to the converter. In still a further arrangement, the above described apparatus further includes an arbiter circuit outputting the enable signal to the voltage converter.

In still another additional arrangement, in the above described apparatus, the arbiter circuit is coupled to the output of the at least one clocked comparator circuit at a first input and the output of a second clocked comparator circuit at a second input, the second clocked comparator circuit configured to compare the output voltage to the reference voltage when the second signal from the fast transient detect circuit is active, and the arbiter circuit outputting the enable signal responsive to the signal at the first input and to the signal at the second input.

In still a further additional arrangement, the above described apparatus further includes a control circuit outputting the control signal to the adjustable oscillator to set a frequency of the oscillator, the control circuit having inputs coupled to the enable signal of the converter, and to the output of the oscillator.

In yet another additional apparatus, in the apparatus above the control circuit further includes a counter for counting the clocks from the oscillator between the enable signals. In still another alternative arrangement, in the above described apparatus, the control circuit decreases a frequency of the oscillator when a number of clocks counted between enable signals is greater than a predetermined maximum. In still a further alternative arrangement, in the above described apparatus, the control circuit increases a frequency of the oscillator when a number of clocks counted between enable signals is less than a predetermined minimum.

In an example method arrangement, the method includes outputting an output voltage by converting an input voltage to supply the output voltage responsive to a converter enable signal; providing a first synchronous enable signal from at least one clocked comparator circuit having a first clock input coupled to an adjustable oscillator, comparing the output voltage to a reference voltage responsive to a pulse on the first clock input and outputting the first synchronous enable signal when the output voltage differs from the reference voltage by more than a threshold voltage; providing a fast transient detect circuit coupled to the output voltage and outputting a second enable signal asynchronously when the output voltage changes rapidly and providing the converter enable signal from either the first synchronous enable signal from the at least one clocked comparator circuit or from the second asynchronous enable signal from the fast transient detect circuit.

In a further arrangement, in the above described method, the method further includes providing comparator circuitry that becomes active on receiving a pulse on the first clock input. In still another arrangement, in the above described methods, the methods include providing the fast transient detect circuit further including providing inputs that are capacitively coupled to the output voltage, and outputting a pulse of a minimum width responsive to a rapid decrease in the output voltage. In still another arrangement, in the above described methods, the methods include controlling a frequency of the adjustable oscillator by counting the number of clock cycles between subsequent converter enable signals that occur over a time period. In yet another arrangement, in the above described methods, the methods include comparing a counted number of clock signals to a maximum threshold and comparing the counted number of clock signals to a minimum threshold. In still another arrangement, in the above described methods, the methods include providing an arbiter receiving the first synchronous enable signal and the second asynchronous enable signal, and outputting the converter enable signal from the arbiter responsive to receiving either of the first synchronous enable signal and the second asynchronous enable signal. In still another alternative arrangement, in the above described methods, the methods include providing a second clocked comparator circuit coupled to output the second asynchronous enable signal responsive to receiving the output of the fast transient detect signal as a clock signal, and comparing the output voltage to a reference voltage responsive to the second asynchronous enable signal. In still a further arrangement, in the methods described above, the methods include turning off the at least one clocked comparator circuit between clock signals on the first clock input.

In another example arrangement, an integrated circuit includes a converter circuit for converting a direct current input voltage to a direct current output voltage, responsive to an converter enable signal; an adjustable frequency oscillator for providing a synchronous clock signal; at least one clocked comparator configured to compare the output voltage to a reference voltage responsive to the synchronous clock signal, and to output a first enable signal responsive to the comparing; a fast transient detect circuit coupled to the output voltage and configured to output a second enable signal asynchronously when the output voltage rapidly changes; and arbiter circuitry configured to output the converter enable signal responsive to either the first enable signal or the second enable signal. In still a further arrangement, in the above described integrated circuit, the integrated circuit further includes wherein the adjustable frequency oscillator and the fast transient detect circuit are always active, and the clocked comparator is active only when it receives a synchronous clock signal form the adjustable frequency oscillator.

Use of the novel arrangements of the present application enable a low power DC-DC converter, and in particular, low power DC-DC converters featuring a low standby current Iq and a fast transient response that provide performance not possible using prior known approaches are enabled by use of the arrangements.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIGS. 1A and 1B illustrate graphs of voltage decay and voltage error in a DC-DC converter;

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected", the term "coupled" is not to be limited to "connected" or "directly connected" but instead the term "coupled" may include connections made with intervening elements, and additional elements and various connections may be used between any elements that are described as "coupled."

An aspect of the current application is now presented to illustrate the decoupling of the output voltage regulation and the low stand-by power consumption of a DC-DC power system to enable both low power, particularly low standby or quiescent current consumption, along with fast output voltage regulation in response to transients at the output in a sampled DC-DC converter. Providing arrangements for DC-DC converters that incorporate these novel features leads to even lower power DC-DC converters than was possible using the prior known approaches.

Figure 2:
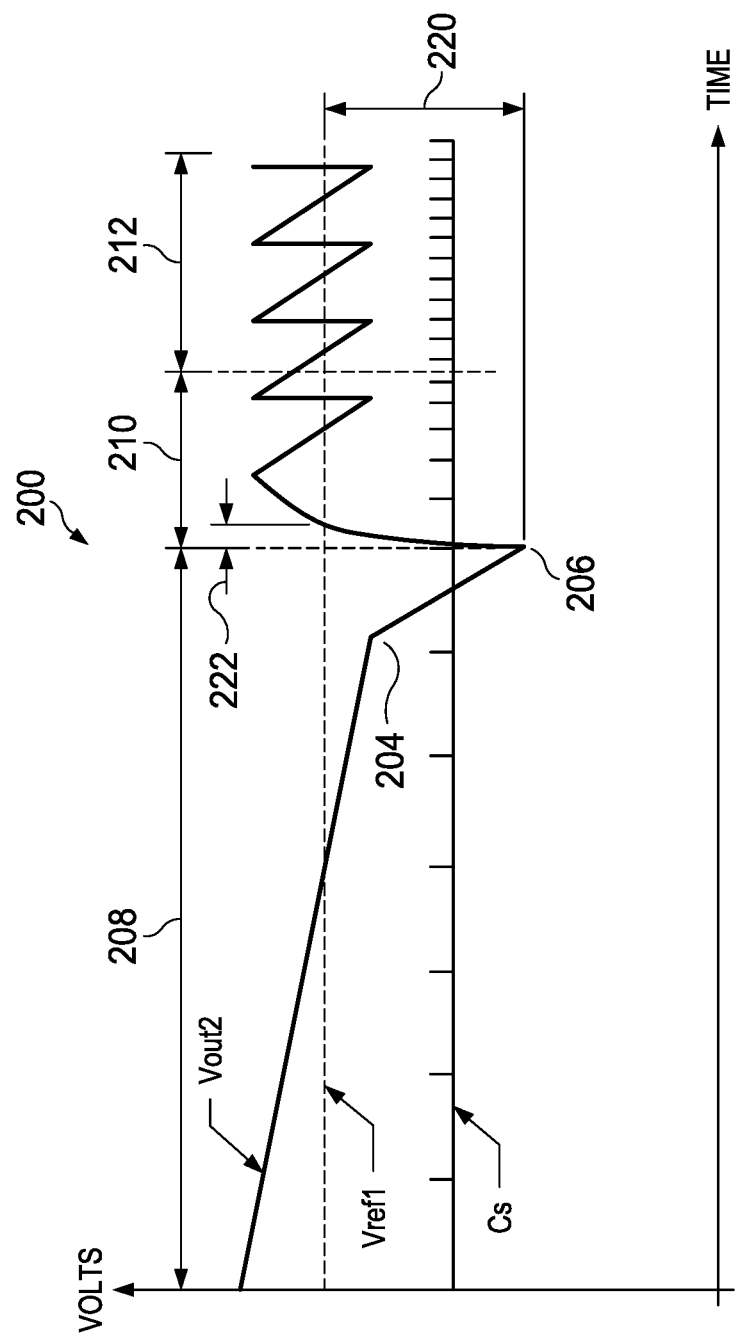
FIG. 2 is a sample graph that illustrates the transient voltage response and sample clock change in a low power DC-DC converter.
Figure 3:
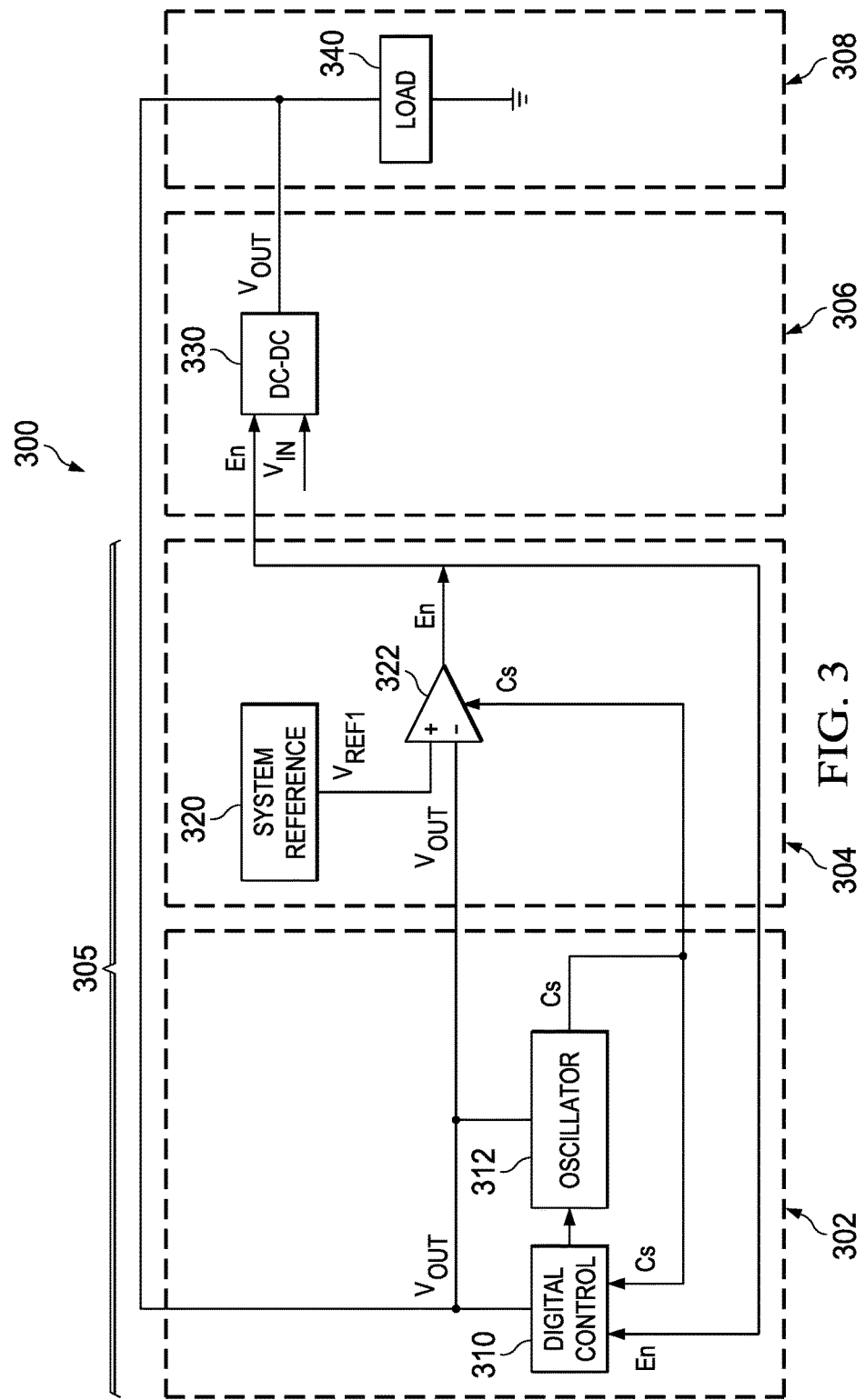
FIG. 3 illustrates in a simplified block diagram a low power, sampled DC-DC converter.
Figure 4:
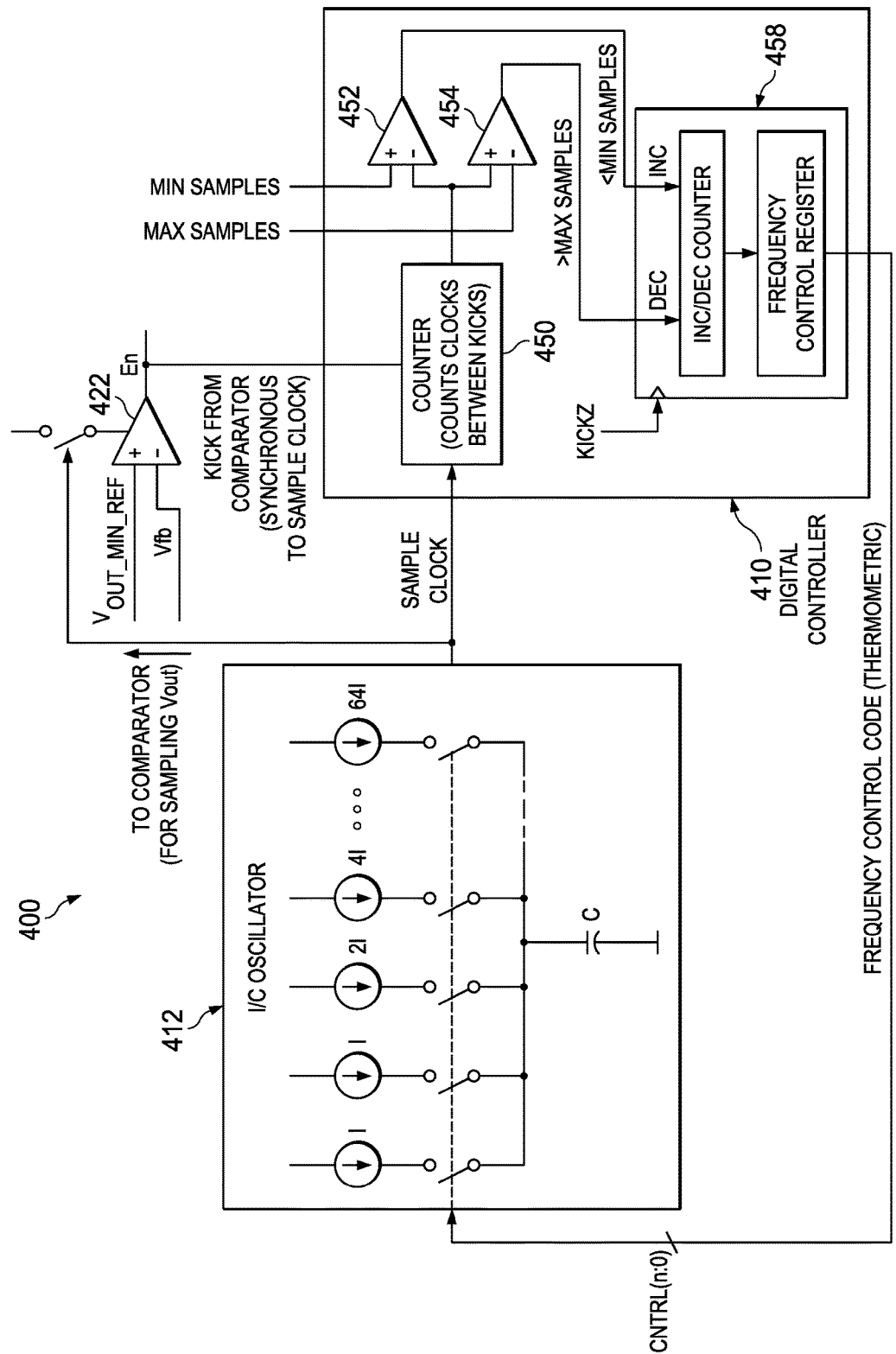
FIG. 4 illustrates in a simplified circuit diagram an example controller for use with DC-DC converters.
Figure 5:
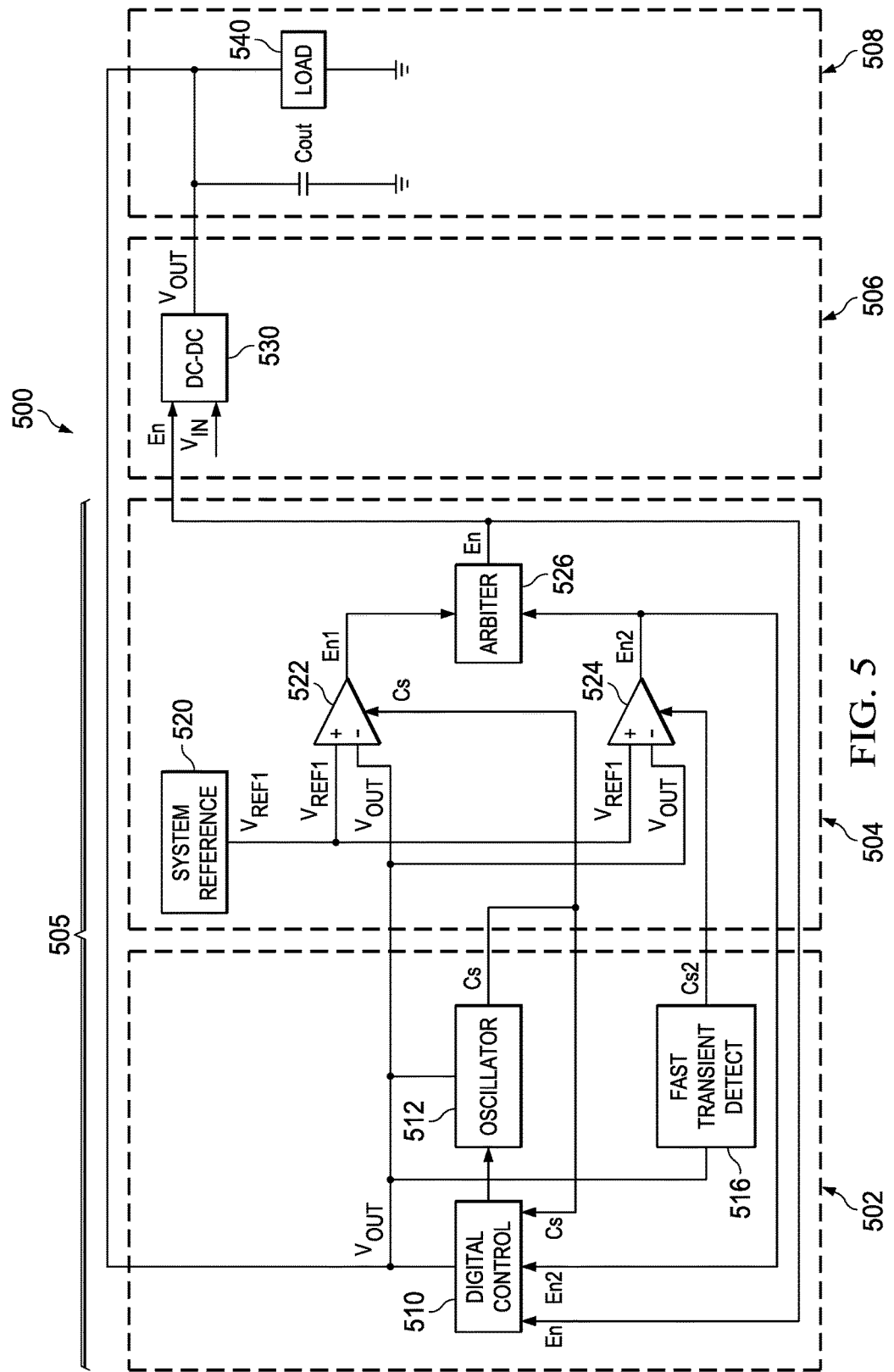
FIG. 5 illustrates in a simplified block diagram an arrangement of the present application.

FIG. 5 illustrates in a block diagram 500 a low power architecture of an example arrangement of the present application. For simplicity of illustration, certain blocks of this new architecture that are also present in FIG. 3 retain the same lower digits from FIG. 3. The numbering scheme includes, for example, the digital control 510, the oscillator 512, the voltage reference 520, the clocked comparator 522, the DC-DC converter 530 and the load 540. In addition, the four sections 502, 504, 506 and 508 retain the same lower digit numberings as in FIG. 3. Added to the novel architecture in section 502 is a Fast Transient Detect (FTD) circuit 516 which has as its input the voltage Vout and as an output another enable signal Cs2. The digital control block 510 of FIG. 5 has an additional input enable (En2), which comes from section 504. Section 504 has two new blocks. The first is an additional clocked comparator 524 which has inputs Vout and Vref1 and operates in a manner similar to the comparator 522, however it is enabled by the second signal Cs2 from the fast transient detect circuit. The output of comparator 524 is another enable (En2) which is coupled to the Arbiter (ARB) 526 and also feeds back to section 502. The second new block is the Arbiter (ARB) 526 which receives enable inputs En1 and En2 from the comparators 522 and 524. The Arbiter output En is coupled back to section 502 and also into section 506 to the DC-DC converter 530. Section 505 again could serve as a stand-alone control section, similar to section 305 from FIG. 3.

In section 504 the arbiter 526 receives enable signals En1, En2 and applies enable signal En to the DC-DC converter 530.

The second comparator 524 can be, in one example arrangement, implemented using the same circuit as for the prior comparator 522. Since these new blocks 524, 526 are only powered when a sample clock Cs1 or signal Cs2 is active, these blocks add little to the standby power consumption of the control section 505.

In section 502, where the components are always powered on, the new Fast Transient Detect (FTD) block 516 monitors the output voltage Vout. In the case of a fast transient (a rapid drop in Vout due to a demand for current at the load) during a sleep mode, block 516 will produce an asynchronous sample signal Cs2 to cause the additional comparator 524 to be clocked, and to produce an additional active enable signal En2. This second enable signal En2 can occur far in advance of the enable signal En1 that would normally come from comparator 522, since the oscillator 512 will be in sleep mode at that point in time, triggering comparator 522 only very infrequently. Since the new comparator 524 is triggered asynchronously and is triggered when the first comparator 522 is not active, it adds little additional power to the sleep mode power consumption of the control section. In addition, since the FTD 516 acts as a sentry to watch for fast transients, the output voltage regulation is no longer dependent only on the sleep mode clock timing. This novel advance in the converter control architecture separates the sleep mode timing interval from the output voltage regulation, and thus enables the circuit designers to set the minimum sleep mode frequency slower than with the prior known approach architectures, while still ensuring a proper response to a transient at the output. By incorporating the fast transient detect circuit to cause an asynchronous trigger signal to the DC-DC converter, the arrangements of the present application enable substantial reduction in the standby current of the converter control circuits.

FIG. 5 illustrates a block diagram 500 for an example architecture to provide a low power DC-DC converter. In an example arrangement, all of the circuits represented by the blocks in FIG. 5 can be implemented as a single integrated circuit. In additional alternative arrangements, the control section 505 can be implemented as an integrated circuit and the remaining blocks can be implemented separately, for example an existing DC-DC converter circuit can be used with the novel circuitry of the arrangements. In addition, the blocks can be implemented as a dedicated hardware design, as a mixture of hardware and software using programmable microprocessors, microcontrollers, digital signal processors and the like, as an application specific integrated circuit (ASIC), as a field programmable gate array programmable device (FPGA), as a complex programmable logic device (CLPD), as an EEPROM device, or using discrete transistors, registers, and the like. The circuit architecture shown as 500 in FIG. 5 can also be further integrated with other features such as battery monitors, battery chargers, temperature sensors, battery condition sensors, and the like to form complete systems in an integrated circuit or on a circuit board or module. Each of these alternative arrangements are contemplated by the inventors as forming additional aspects of the present application that fall within the scope of the appended claims.

Figure 6:
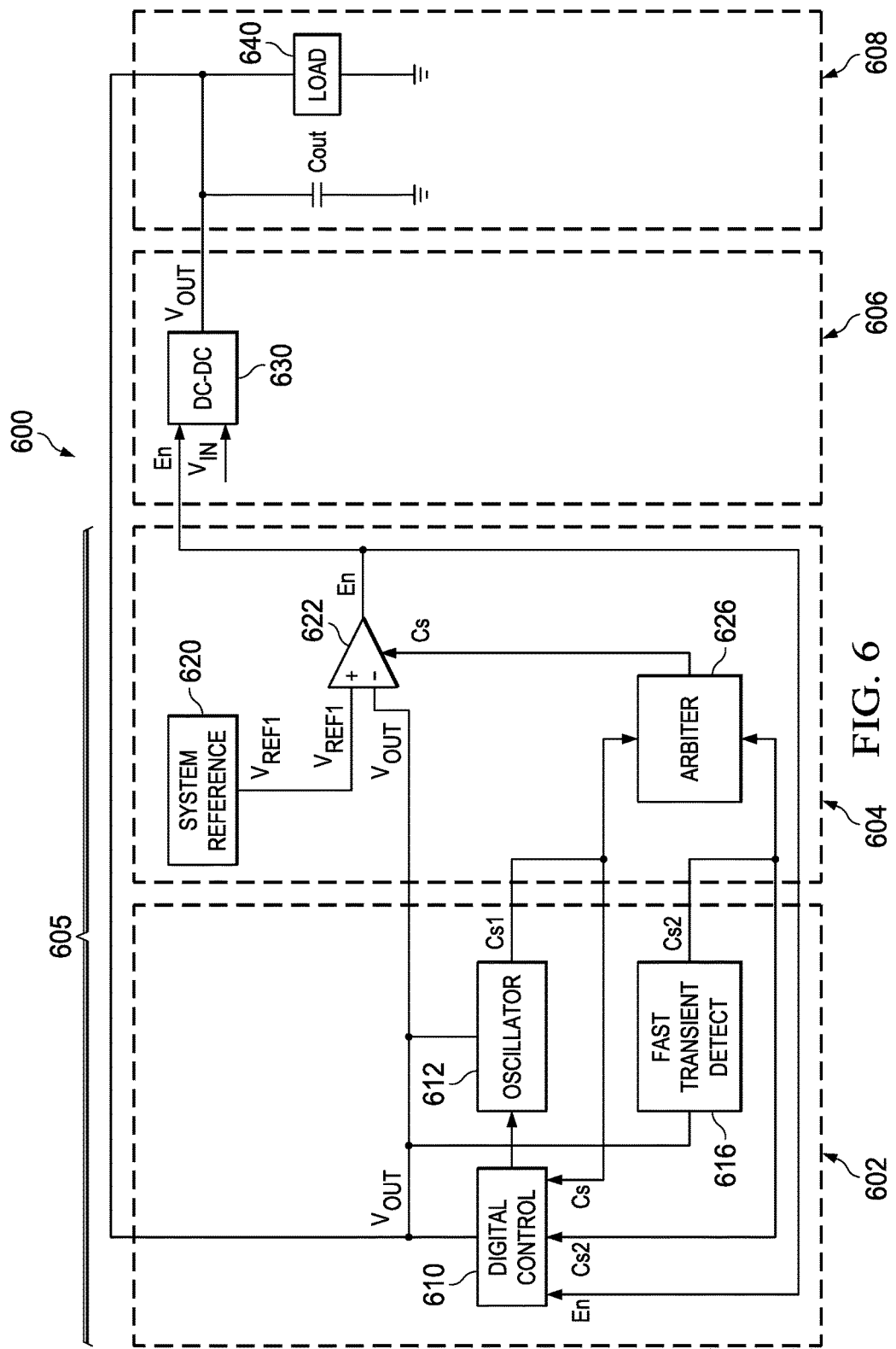
FIG. 6 illustrates in a simplified block diagram another arrangement of the low power architecture of the present application.

FIG. 6 illustrates in a block diagram 600 another alternative low power architecture arrangement of the present application. The reader will notice that several blocks of this new architecture include some of the blocks from FIG. 5, with the most significant digit (5) now incremented to 6, including the digital control 610, the oscillator 612, the FTD 616, the reference 620, the comparator 622, the DC-DC converter 630 and the load 640. In addition, the four sections 602, 604, 606 and 608 retain the same connotations as sections 502, 504, 506, 508 in FIG. 5. In block diagram 600, section 602 and 604 form a control section 605 with inputs $V_{OUT}$ and output En1. This control section 605 is interchangeable with the control section 505 from FIG. 5 and performs the same function, however the function now uses a different circuit architecture.

In section 602, the digital control block 610 can be implemented in the same manner as the control 510 in FIG. 5, with the exception that the input En2 from digital control 510 has been replaced with the FTD signal Cs2. The FTD 616 signal Cs2 output is coupled to block 604 and back to the digital control block 610. Section 604 is simplified from block 504 by removing the second comparator. The first comparator 622 can be implemented in the same manner as comparator 522 of FIG. 5, with the only change is that its clock Cs now comes from the Arbiter (ARB) 626. The arbiter 626 now receives the synchronous clock Cs1 from the oscillator Osc 612 and the asynchronous signal Cs2 from the FTD 616. Arbiter 626 generates an output clock Cs which is coupled to comparator 622. Comparator 622 has an output signal En1 which is coupled to the digital control 610 and to the DC-DC converter 630 in section 606. Section 606 and 608 remain unchanged from blocks 506 and 508 in FIG. 5.

In operation, section 602 produces two sample clocks Cs1 and Cs2 for section 604 and has inputs Vout and En1. In section 604, arbiter ARB 626 receives the synchronous sample clock Cs1 and the asynchronous sample clock Cs2 and outputs a synchronized sample clock Cs to the single comparator 622. Comparator 622 tests to see if voltage Vout is less than Vref and if so, generates an active enable signal En1. The En1 signal from comparator 622 is coupled to DC-DC converter 630 in section 606. If the enable signal En1 is active, the DC-DC converter activates, increasing the voltage of the Vout signal which is coupled to the Load 640 and to an output capacitor Cout, and also which is coupled in a feedback path to section 602.

The circuit topology in FIG. 6 presents another alternative arrangement that forms another aspect of the present application, and because of the use of the FTD circuit, allows the output voltage regulation to be independent of the frequency of the sleep mode clock generated by OSC 612. In order to minimize the power in standby or sleep modes, the addition of the FTD 616 to section 602, which is powered on at all times, needs to be done in a manner that ensures the additional power consumption will be small.

As described above with respect to FIG. 5, the circuit block diagram for the circuit of FIG. 6 can also be implemented as dedicated hardware on an integrated circuit, as a mix of software and hardware, as software executed on a programmable device, and using various programmable and configurable devices such as FPGAs, CPLDs, EEPROMs, and the like to form integrated circuits, modules, or circuit boards, and the circuit 600 can also be integrated with other functions to form a highly integrated system.

Figure 7:
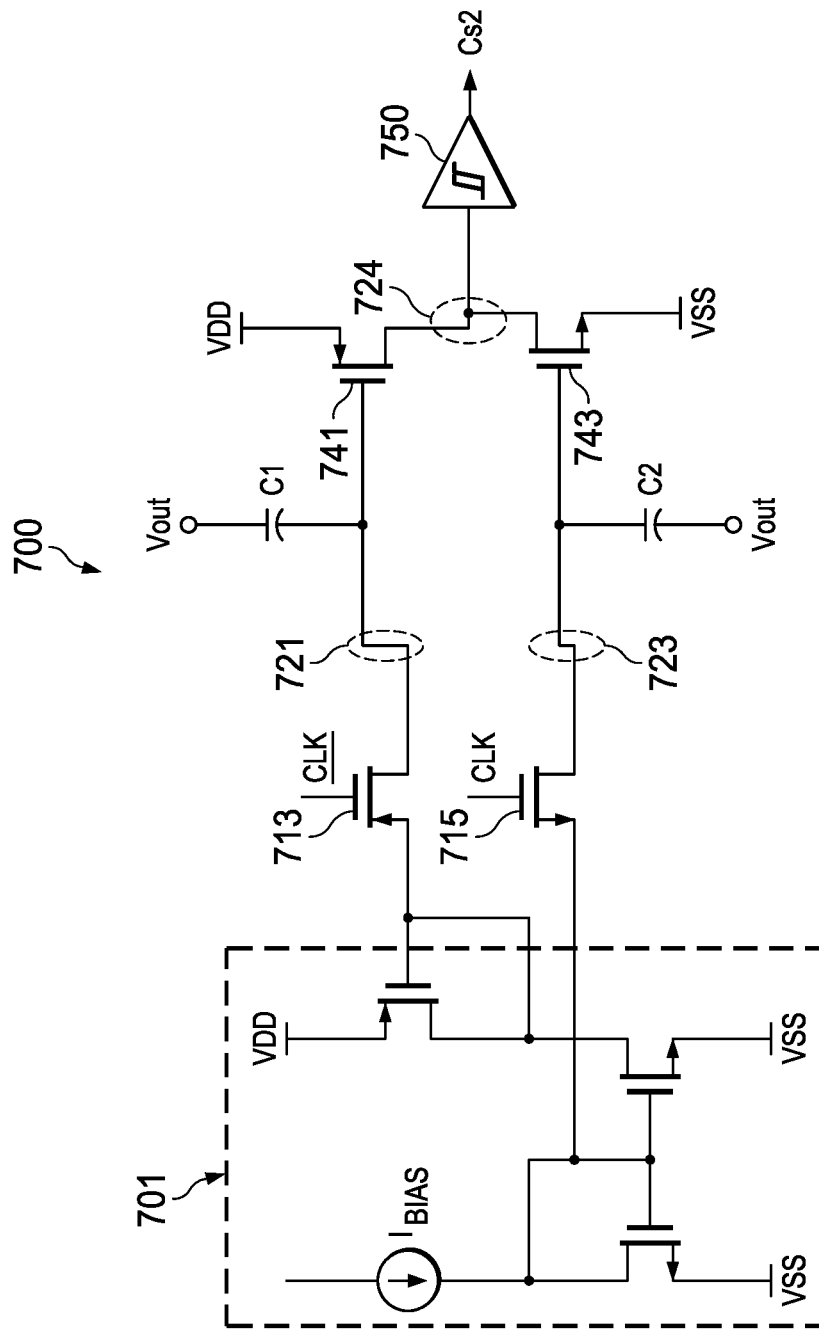
FIG. 7 illustrates in a circuit schematic an example low power fast transient detect circuit for use with the arrangements.

FIG. 7 illustrates in a circuit schematic an example low power fast transient detect circuit 700 that can be used to implement the FTD blocks 516 and 616 in the prior figures. Alternative fast transient detect circuits can also be used to form additional arrangements of the present application and the example circuit of FIG. 7 does not limit the arrangements. In FIG. 7, VDD represents the positive side of the circuit power supply and VSS is the negative side of the power supply or ground potential. A current mirror in section 701 ensures that the upper and lower branches of a comparator are biased equally with a bias current ($I_{BIAS}$) to produce respective bias voltages at the sources of transistors 713 and 715 from respected diode-connected transistors. Clock signal CLK and clock bar signal CLK drive the gates of transistors 715 and 713. Nodes 721 and 723 are high impedance nodes which are connected to the respective gates of transistors 741 and 743. The converter output voltage Vout is applied to nodes 721 and 723 through capacitors C1 and C2. Transistors 741 and 743 are connected at node 724 which is the input of a Schmitt trigger 750.

In operation the transistors 715 and 713 are coupled to the gates of transistors 741 and 743, respectively, to periodically set their gate bias to the bias voltage of section 701. When the CLK signal is active, transistors 713 and 715 are on. When the CLK signal is inactive, transistors 713 and 715 are off. A transient on output voltage Vout will drive one of nodes 721 and 723 to activate one of transistors 741 and 743. This action will cause the Schmitt trigger 750 to generate a digital pulse when a fast transient of output voltage Vout is detected. The capacitive coupling of output voltage Vout to high impedance input nodes is another low power design technique, in that little or no current is drawn from the output voltage Vout, other than leakage current.

Thus the FTD circuit 700, which is always monitoring the Vout signal, is coupled to the output Vout using capacitive coupling and high impedance inputs. The FTD circuit operates so that only transients at Vout will cause a pulse from the Schmitt trigger 650 when the oscillator clock is not active, so that the normal enable path is not active. Transients that occur between samples can then be detected and the DC-DC converter can be enabled between clocks from the oscillator.

In a stand-by or sleep mode of operation, the control circuitry for the DC-DC converter will generate enable signals either when a low frequency clock is generated in response to the oscillator, or when a fast transient is detected. Importantly the fast transient detect circuitry is asynchronous to the clock from the oscillator and operates independently from the oscillator circuitry. The arbiter circuit ensures that the enable signals from either the oscillator or the fast transient detector are synchronized so that the enable signal is properly applied at the DC-DC converter. The arbiter passes the synchronized enable signals to the DC-DC converter.

Figure 8:
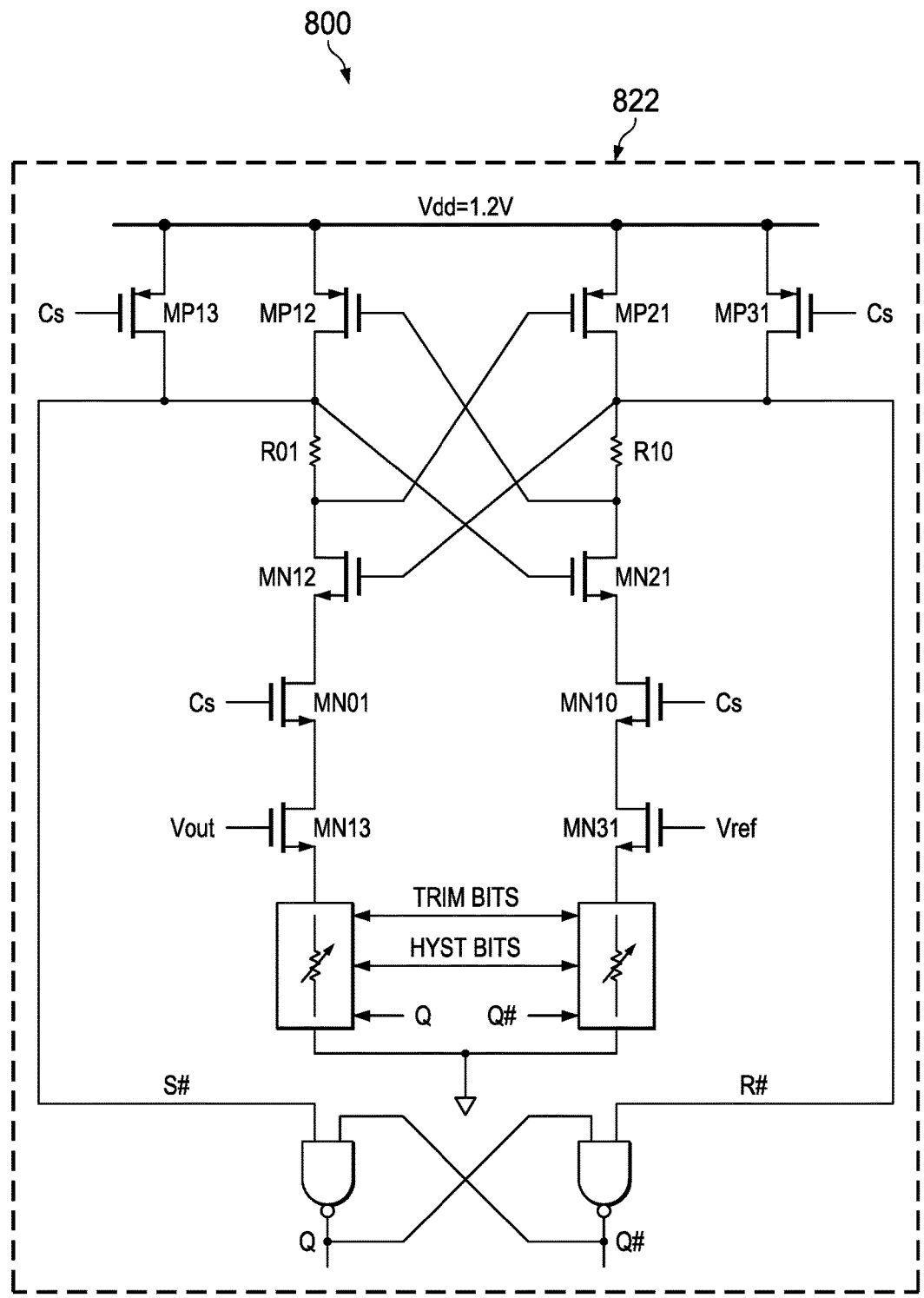
FIG. 8 depicts in a circuit schematic a clocked comparator circuit for use with the arrangements.

FIG. 8 depicts in a detailed circuit diagram 800 an example ultra-low power clocked comparator circuit 822 which can be used to implement the comparators such as 522, 622, in FIGS. 5 and 6 above. Instead of a classic comparator circuit that requires an active standby current, or an "always on" comparator, the clocked comparator 822 is based on a sense amplifier topology and is clocked so that substantial power is only consumed when the Vout signal is sampled, such as when the oscillator provides a pulse on clock input Cs. The clocked comparator receives as inputs the output voltage Vout and a reference voltage Vref and outputs a latched enable signal for one clock cycle. The clocked comparator can be adjusted to provide voltage offsets using the trim bits or hysteresis bits to adjust a resistance between the input transistors MN13, MN31 in FIG. 8, and a ground voltage. The sense amplifier is formed as a flip flop using pull up transistors MP12, MP21, and pull down transistors MN12, MN21, with clock input transistors MN01, MN10 coupled to the clock signal inputs to receive clock signal Cs, such as from the oscillator. The output SR latch is also clocked by signal Cs using pullup transistors MP13, MP31 to capture and amplify the output nodes of the flip-flop transistors and to latch the output, and has true and complement comparator outputs Q and Q#. In an example implementation using the comparator circuit of FIG. 8, a dynamic standby current of 1 nA/kHz was achieved. Use of the clocked comparator of FIG. 8 in the arrangements of FIGS. 5 and 6 therefore reduces standby current consumption. In additional alternative arrangements, other low power comparators could also be used to implement these functions.

Figures 9, 10:
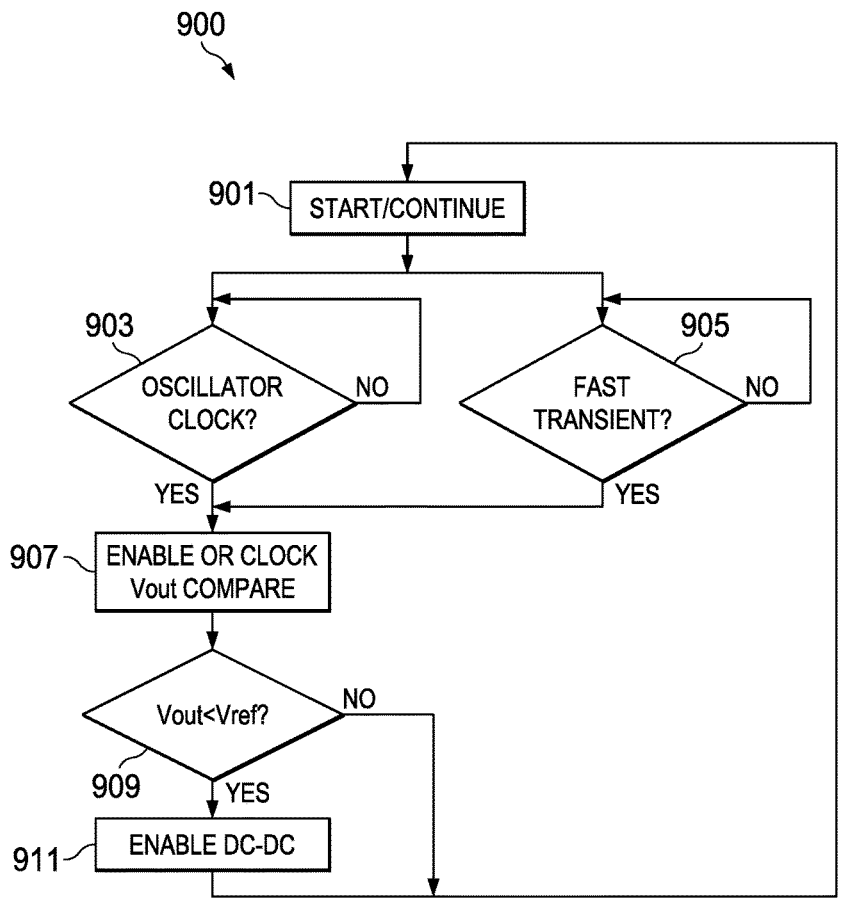
FIG. 9 illustrates in a flow diagram a method arrangement for operating a low power DC-DC converter with the fast transient detect circuitry.
FIG. 10 is a table of results from a test circuit incorporating features of the present application and compared to a best in class prior approach DC-DC converter.

FIG. 9 illustrates in a flow diagram 900 a method arrangement for operating a low power DC-DC converter with novel features including the fast transient detect circuitry. In FIG. 9 there are two parallel control loops, a fast control loop that incudes block 905 and the slow control loop including adjustable frequency that includes block 903, with the oscillator. Receiving enable inputs from the two loops is block 907 which performs arbiter functions, which is coupled to a comparison block 909 that determines whether the Vout output voltage is below a reference voltage Vref, and from that block 909 the method flows to block 911 where the DC-DC converter is enabled and the voltage Vout can be increased.

The method begin at block 901. This block is also used to continue the method in later steps, as the method operates continuously to regulate the output voltage and control the DC-DC converter. The fast and slow control loops then operate in parallel, the adjustable frequency or slow loop including block 903, and the fast transient detect loop including block 905. In block 903, the loop waits for the next clock from the oscillator. The clock occurs at a frequency that is lowered or raised according to the number of enable signals observed, if the enable signals are increasing over time, the frequency is raised as the load is requiring more current, while if the number of enable signals is reduced over time, the frequency of the oscillator can be reduced (as the output voltage is remaining high, that is, the load is not demanding any current). Whenever the oscillator reaches a sample point, an enable signal or clock signal is output and the method flows to block 907.

In parallel, and asynchronously, the fast transient detection is performed in block 905. When a fast transient is detected, indicating a rapid fall in the output voltage beyond a threshold (the Schmitt trigger threshold in FIG. 7, for example), the method transitions to block 907.

At block 907 the arbiter function determines whether a clock enable signal from the oscillator, a clock or enable from the fast transient detector, or both, are present, and using the highest priority signal, the method transitions to the compare step at 909.

In decision block 909, the output voltage is compared to the reference voltage. If the output voltage is less than the reference voltage, the DC-DC converter is enabled and the input voltage is used to power the output and charge the output capacitor to maintain the output voltage. If the output voltage is still higher than the reference voltage at the decision block 909, the method flows back to the Start/Continue step in block 901 and continues operating.

At block 911, after the DC-DC converter is enabled the method transitions back to the Start/Continue step in block 901 and continues operating.

In this manner, a low standby current DC-DC converter control method is provided. Because the fast transition detection in the fast loop is performed independently of the adjustable frequency oscillator used in the slow loop, the oscillator can be adjusted to clock the comparator circuit very infrequently during a sleep or stand-by mode, and the DC-DC converter will still rapidly respond to a fast transient on the output voltage. As the comparator function is only performed when either the adjustable frequency oscillator pulse, or a fast transient detect signal, is present, the power used for the comparator is very low. The arrangements also saves power as the sampling frequency is very low in a standby or sleep mode, leaving only the fast transient circuit actively running during times of low load power demand.

FIG. 10 presents in a table results observed from a test circuit formed incorporating the features of the present application, as compared to the "best in class" prior known approach converters. In FIG. 10, the table 1000 has 6 columns labeled Line #, Parameter, Test ULP A, ULP B, Best in Class and % delta. The results are presented in 6 rows that illustrate particular data lines, numbered 1-6.

Table 1000 shows the results of testing of the ultra-low power (ULP) DC-DC converter (ULP). The tests were run under 2 conditions, denoted by columns ULP A and ULP B. The differences in test conditions were the step load applied (shown in line 2) and the amount of output capacitance connected to Vout (shown in line 1). ULP B is a close match to the tests that were performed on the best-in-class (BIC) converter of the prior known approaches, while ULP A was performed to show the very efficient operation at very small load currents (5 nA).

Reviewing the data in table 1000 line by line, the output capacitance, line 1, is typically used to dampen the ripple voltage from the DC-DC converter, with a lower value being required when the output voltage regulation is better. The lower the capacitance, the less area required by the circuit, so there is a tradeoff between ripple voltage and board space. As the data indicates, in both of the ULP test cases including the features of the arrangements of the present application, the amount of capacitance required is reduced by at least 90%, which is a substantial improvement. The test current load, line 2, is a step current starting at zero to 5 milliamps and then increasing to 50 or 100 mA. In comparison to the best in class converter, this is twice the step load applied, making it a more severe test. The $3^{rd}$ line, Vrec indicates how quickly the converter recovers from a voltage dip. In the tests shown in the table the ULP A and ULP B both measured 10 mV/sec while the best in class prior approach converter recovers much more slowly, at 0.5 mV/sec. The new design provides a 20× improvement in recovery time which lead to an improvement in load regulation. Of special interest is line 4, the Iq or standby current. This is the quiescent current that the converter draws while in the sleep mode. In comparing the ULP B with the prior known best in class, a 94.6% reduction from 720 nA to 39 nA is achieved. The reduction in Iq provides a substantial improvement in the life of cordless battery operated devices. Line 5, shows the Vdip measurements which is another indication of load regulation. ULP B measured a 9 mV Vdip, compared to the BIC showing 37 mV Vdip, a 75.7% improvement. ULP A measured 12.3 mV Vdip, achieving a 66.8% improvement over the prior known BIC.

In addition, a figure of merit FOM has been determined for comparing the transient response for the converters and is shown in the last line, line 6, of table 1000. The FOM is valid when comparing very low ESR/ESL load capacitors and similar load current ranges. The FOM has units in seconds.

The figure of merit is defined by the equation:

$$\text{FOM} = (I_{q\_no\ Load}/I_{Max\ Load}) * (C_{Load} * \Delta V_{OUT}/\Delta I_{Load}) \quad \text{Equation 1}$$

In Table 1000, it can be seen that the FOM shows that use of the novel features of the arrangements described above enable converters that are greatly improved over the best in class converters of the prior known approaches. The FOM for ULP A is shown as 7 picoseconds, while the FOM for ULP B is 0.5 picoseconds, compared to a FOM for the prior known approach converter of a much slower 1.2 nanoseconds. The improvements in transient performance obtained by use of the arrangements thus lead to surprising results in increased performance.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An apparatus, comprising:
   a voltage converter coupled to receive a direct current input voltage and produce a direct current output voltage responsive to a converter enable signal;
   a first comparator configured to produce a first enable signal in response to a first clock signal and a difference between the output voltage and a reference voltage;
   an adjustable frequency oscillator configured to produce the first clock signal at a frequency determined by a control signal;
   a fast transient detect circuit configured to produce an asynchronous clock signal upon detecting a rapid change in the output voltage;

a second comparator configured to produce a second enable signal in response to the asynchronous clock signal and a difference between the output voltage and the reference voltage; and arbiter circuitry configured to produce the converter enable signal responsive to either of the first enable signal or the second enable signal.

2. The apparatus of claim 1, wherein the fast transient detect circuit further comprises an output transistor and an input terminal for receiving the output voltage, and wherein the input terminal is coupled to the output transistor by a capacitor for conducting an output voltage transient to the output transistor.

3. The apparatus of claim 1, wherein the fast transient detect circuit comprises at least one transistor arranged to apply a bias voltage to an output transistor in response to a clock signal.

4. The apparatus of claim 1, and further comprising a control circuit configured to apply the control signal to the adjustable oscillator to set the frequency of the adjustable frequency oscillator, wherein the control circuit is coupled to receive the converter enable signal and the first clock signal.

5. The apparatus of claim 4 wherein the control circuit further comprises a counter for counting the clock pulses from the oscillator during a period of the first enable signal.

6. The apparatus of claim 5, wherein the control circuit is configured to decrease the frequency of the oscillator when a number of clock pulses counted is greater than a predetermined maximum.

7. The apparatus of claim 5, wherein the control circuit is configured to increase the frequency of the oscillator when a number of clock pulses counted is less than a predetermined minimum.

8. A method, comprising:
producing a direct current output voltage from a direct current input voltage responsive to a converter enable signal;
producing a synchronous clock signal from an adjustable oscillator circuit;
producing an asynchronous clock signal from a fast transient detect circuit in response to a change in the output voltage; and
selectively producing the converter enable signal in response to either the synchronous clock signal or the asynchronous clock signal from the fast transient detect circuit.

9. The method of claim 8, comprising:
enabling a comparator to compare the direct current output voltage to a reference voltage in response to the synchronous clock signal; and
producing the converter enable signal by the comparator in response to the step of enabling.

10. The method of claim 8, wherein the step of producing an asynchronous clock signal comprises capacitively coupling a change in the direct current output voltage to a transistor of the fast transient detect circuit.

11. The method of claim 8, and further comprising controlling a frequency of the adjustable oscillator by counting a number of clock cycles between subsequent converter enable signals that occur over a time period.

12. The method of claim 11, and further comprising comparing the number of clock cycles to a maximum threshold and decreasing the frequency of the adjustable oscillator when the number of clock cycles is greater than the maximum threshold.

13. The method of claim 11, and further comprising comparing the number of clock cycles to a minimum threshold and increasing the frequency of the adjustable oscillator when the number of clock cycles is less than the minimum threshold.

14. The method of claim 8, comprising applying a bias voltage to an output transistor of the fast transient detect circuit in response to a clock signal.

15. An integrated circuit, comprising:
a converter circuit for converting a direct current input voltage to a direct current output voltage, responsive to a converter enable signal;
an adjustable frequency oscillator for providing a synchronous clock signal;
a comparator configured to produce the converter enable signal in response to a comparator clock signal and a difference between the output voltage and a reference voltage;
a fast transient detect circuit configured to produce an asynchronous clock signal upon detecting a rapid change in the output voltage; and
arbiter circuitry configured to produce the comparator clock signal responsive to either of the synchronous clock signal or the asynchronous clock signal.

16. The integrated circuit of claim 15, wherein the adjustable frequency oscillator and the fast transient detect circuit are always active when the integrated circuit is powered up, and the comparator is active only when it receives the comparator clock signal.

17. The integrated circuit of claim 15, wherein the fast transient detect circuit comprises an output transistor and an input terminal for receiving the output voltage, and wherein the input terminal is coupled to the output transistor by a capacitor for conducting an output voltage transient to the output transistor.

18. The integrated circuit of claim 15, wherein the fast transient detect circuit comprises at least one transistor arranged to apply a bias voltage to an output transistor in response to a clock signal.

19. The integrated circuit of claim 15, comprising a control circuit configured to apply a control signal to the adjustable oscillator to set a frequency of the synchronous clock signal, wherein the control circuit is coupled to receive the converter enable signal and the synchronous clock signal.

20. The integrated circuit of claim 19 wherein the control circuit comprises a counter for counting the clock cycles of the synchronous clock signal and adjusting the frequency of the synchronous clock signal in response to minimum or maximum count thresholds.

\* \* \* \* \*